United States Patent Office

3,709,787
Patented Jan. 9, 1973

3,709,787
PRODUCING L-GLUTAMIC ACID
Toshihiko Kanzaki and Isamu Nakatsui, Kakogawa, Yoshio Sugiyama and Masaaki Nishio, Takasago, and Michio Ishikawa, Kobe, Japan, assignors to Takeda Chemical Industries, Ltd., Osaka, Japan
No Drawing. Filed Dec. 23, 1970, Ser. No. 101,113
Claims priority, application Japan, Dec. 25, 1969, 44/104,578
Int. Cl. C12d 13/06
U.S. Cl. 195—30
2 Claims

ABSTRACT OF THE DISCLOSURE

Microbiological production of L-glutamic acid by cultivating an L-glutamic acid-producing microorganism such as *Brevibacterium flavum* (ATCC 14067) in a culture medium containing copper, and acetic acid as the carbon source.

---

This invention relates to an improvement in producing L-glutamic acid by means of cultivation of an L-glutamic acid-producing microorganism. More particularly, it is concerned with a microbiological production of L-glutamic acid with the use of acetic acid as a principal source of carbon.

Heretofore, in regard to the production of L-glutamic acid, some metals have been described as being capable of remarkably promoting the fermentation with use of saccharides as raw materials. That is, manganese or zinc is known to be effective in promoting the production of the acid from sugars. However, none has so far suggested copper for such purposes.

It has now been found by the present inventors that copper, when dispersed at a suitable concentration in the culture media, does specifically promote the production of L-glutamic acid, and also that the effect of the copper is particularly outstanding when acetic acid is employed as a principal source of carbon for the L-glutamic acid-producing microorganism.

The principal object of this invention is therefore to provide an improvement in the process for producing L-glutamic acid fermentatively with an elevated and steady yield of the acid.

Said object is realized by incorporating a prescribed amount of copper into the culture medium for the fermentative production of L-glutamic acid by the microorganism. Said incorporation is usually effected by adding an adjusted amount of the copper source into the culture medium, and then allowing the copper to disperse in the medium.

Although many L-glutamic acid-producing microorganisms have so far been known, as described in U.S. Pats. Nos. 3,096,252 and 3,220,929, French Pats. Nos. 1,546,260 and 1,580,214 etc. and any of those microorganisms may be employed, an eminent effect of this invention will be seen when a microorganism that is capable of producing L-glutamic acid with the use of acetic acid as a principal source of carbon is employed. Thus, microorganisms of the genera Brevibacterium, Corynebacterium and Micrococcus may be mentioned by way of example. More specifically, the known strains employable to this invention are exemplified as follows:

*Brevibacterium thiogenitalis* No. 594 (ATCC 19240)
*Brevibacterium thiogenitalis* D-248 (IFO 12331)
*Brevibacterium thiogenitalis* D-253 (IFO 12400)
*Brevibacterium thiogenitalis* D-254 (IFO 12401)
*Brevibacterium flavum* (ATCC 14067)
*Brevibacterium flavum* BN-13 (IFO 12525)
*Brevibacterium* sp. 111-SO9 (IFO 12332)
Corynebacterium sp. No. 1602 (IFO 12399)
Corynebacterium sp. No. 186 (IFO 12398)
*Micrococcus glutamicus* (ATCC 13032)
*Micrococcus glutamicus* No. 534–MS–023 (IFO 12523)
*Micrococcus glutamicus* No. 541–MS–117 (IFO 12524)

The abbreviations "ATCC" and "IFO" in the parentheses mean "American Type Culture Collection," Maryland, U.S.A. and "Institute for Fermentation, Osaka," Osaka, Japan, respectively. The numbers attached to the abbreviations are accession numbers of the strains at the specified depositories and therefore those organisms are available to anyone who is interested in and qualified in the field of this art.

In incorporating copper in the culture medium, metallic copper and, more generally, copper compounds are employed so long as they are soluble in water at a desired concentration within the range specified below. Those compounds may be of either cuprous (i.e. monovalent) or cupric (i.e. divalent) compounds. Among those compounds are such varied inorganic or organic copper compounds as copper sulfate, copper chloride, copper bromide, copper iodide, copper thiocyanate, copper oxide, copper hydroxide, copper ammonium chloride, copper sulfide, copper phosphate, copper carbonate, copper hydroxide carbonate, copper ethylenediaminetetraacetate, copper oxalate, copper citrate, copper acetate or the like. It is possible to employ, as desired, naturally occurring copper-containing materials such as copper-containing grades of corn steep liquor, copper-rich distiller byproduct and the like, with a precaution with respect to the resulting concentration of the copper dispersed in the culture medium. Of course, those materials and/or those compounds may be employed in combination.

The concentration of copper to be adjusted for the production of L-glutamic acid, in terms of copper or a copper cation in the main-culture medium, is about 0.005 to 1 part per million and, preferably from about 0.01 to about 0.5 part per million.

Those copper compounds and/or copper-containing materials may be added to the main-culture medium as its preparation or in the course of cultivation. Alternatively those can be so arranged that the copper will be transferred along with the organism from the seed-culture medium to the main-culture medium. Thus, any suitable incorporating means and any suitable time for the addition may be employed, but the addition should be made before substantial production of L-glutamic acid occurs in the main-culture medium.

Among the medium ingredients, besides copper ions, to be employed in the practice of this invention are sources of carbon and of nitrogen as well as other nutrients. Among carbon sources, acetic acid is particularly beneficial in terms of the effect of copper ions. While the precise mechanism involved remains yet to be elucidated, it appears that copper ions promote the activity of the enzyme system responsible for the production of L-glutamic acid from such carbon source. Among the nitrogen sources that can be utilized to advantage are ammonia gas, aqueous ammonia, ammonium salts, urea and the like. The inorganic salts that can be employed include, among others, the salts of K, Mg, Mn, Fe, Ca and phosphoric acid. If necessary, such other nutrients as yeast extract, dry yeast, corn steep liquor, etc. may also be incorporated.

Other culture conditions such as the pH of the culture medium, the cultivation temperature or the culture period are more dependent on the microorganism employed, but they are generally about pH 6.5 to 9.5, 25° to 37° C. and 20 to 60 hours, respectively.

This invention will be further described by reference to the following examples, which should by no means be construed as being limitative of the scope of the invention. In the examples as well as in the foregoing, abbreviations "l.," "ml.," "g.," "mg.," "γ," "r.p.m.," "p.p.m." and "%" mean "liter(s)," "milliliter(s)," "grams(s)," "milligram(s)," "gamma(s)," "revolutions per minute," "part(s) per million" and "percent," respectively. Percentages with regard to the components of the culture media are on the weight per volume basis, i.e. grams per deciliter, and percentages in other respects are on the weight basis unless otherwise noted.

EXAMPLE 1

20 ml. portions of a seed-culture medium consisting of glucose (2.0%), urea (0.5%), $KH_2PO_4$ (0.1%), $MgSO_4 \cdot 7H_2O$ (0.05%), $FeSO_4 \cdot 7H_2O$ (0.01%), $MnSO_4 \cdot 4H_2O$ (0.001%) polyoxyethylene sorbitan monostearate [1] (0.02%), $CaCO_3$ (0.1%), sodium oleate (200 mg./l.) and water were distributed into 200 ml. conical flasks, which were then sterilized in the conventional manner. Each flask was inoculated with one of the strains listed in Table 1 and the inoculated flask was incubated on a rotary shaker of 200 r.p.m. at 28° C. for 24 hours.

Separately, 50 ml. portions of a main-culture medium consisting of ammonium acetate (1.2%), $KH_2PO_4$ (0.1%), $MgSO_4 \cdot 7H_2O$ (0.05%), $MnSO_4 \cdot 4H_2O$ (0.001%), $FeSO_4 \cdot 7H_2O$ (0.01%) a varying amount of copper as shown in Table 1 (added as $CuSO_4 \cdot 5H_2O$), vitamin $B_1$ (100γ/l.), biotin (30γ/l.), sodium oleate (200 mg./l.), phenol red [2] (10 mg./l.) and water were distributed into muffled conical flasks of 200 ml. capacity, which were then sterilized. 3.5 ml. portions of the above-obtained seed culture were transferred to those flasks and incubated at 32° C. under shaking for 48 hours. The main carbon source acetic acid was fed into each flask in 30 installments at intervals of 1 hour starting with the 10th hour of incubation, each installment being 0.5% of acetic acid relative to the initial volume of the culture medium. In all, the acetic acid thus added amounted to 15% by weight relative to the initial volume of the medium. During the cultivation, the medium was kept at pH between 7 and 8.5 with the addition of a 14% aqueous ammonia solution.

The results thus obtained are shown in Table 1.

TABLE 1.—EFFECTS OF DIFFERENT CONCENTRATIONS OF COPPER UPON THE YIELDS[1] OF GLUTAMIC ACID

| Cu, p.p.m. | 0 | 0.005 | 0.01 | 0.02 | 0.05 | 0.1 | 0.2 | 0.5 | 1.0 | 2.5 |
|---|---|---|---|---|---|---|---|---|---|---|
| Organism:[2] | | | | | | | | | | |
| Brevibacterium thiogenitalis D-248 (IFO 12331) | 8 | 26 | 35 | 40 | 49 | 52 | 46 | 35 | 21 | 5 |
| Brevibacterium flavum BN-11 (IFO 12525) | 5 | 13 | 19 | 38 | 46 | 43 | 40 | 33 | 15 | 5 |
| Micrococcus glutamicus No. 534 MS-023 (IFO 12523) | 10 | 17 | 23 | 35 | 41 | 43 | 37 | 32 | 15 | 0 |
| Corynebacterium sp. No. 186 (IFO 12398) | 10 | 20 | 29 | 41 | 50 | 51 | 49 | 35 | 25 | 8 |

[1] The yields are in weight percent relative to the acetic acid used.
[2] All the organisms used require higher unsaturated fatty acid for growth.

EXAMPLE 2

20 ml. portions of a seed-culture medium consisting of glucose (2.0%), urea (0.5%), $KH_2PO_4$ (0.1%), $MgSO_4 \cdot 7H_2O$ (0.05%), $FeSO_4 \cdot 7H_2O$ (0.01%), $MnSO_4 \cdot 4H_2O$ (0.001%), biotin (5γ/l.), vitamin $B_1$ (100γ/l.) and water were distributed into conical flasks of 200 ml. capacity, which were then sterilized. Each flask was inoculated with Brevibacterium thiogenitalis No. 594 (ATCC 19240) and incubated at 28° C. on a rotary shaker of 200 r.p.m. for 24 hours.

Separately, 50 ml. portions of a main-culture medium consisting of ammonium acetate (1.2%), $KH_2PO_4$ (0.1%), $MgSO_4 \cdot 7H_2O$ (0.05%), $MnSO_4 \cdot 4H_2O$ (0.001%)

[1] Commercially available, e.g. in the trade name of "Tween 60" distributed by Atlas Powder Company, Wilmington, Del., U.S.A.
[2] As a pH indicator. Known as phenolsulfonphthalein.

$FeSO_4 \cdot 7H_2O$ (0.01%), copper (0.05 p.p.m., added in the form of cupric acetate), biotin (2γ/l.), vitamin $B_1$ (100γ/l.), phenol red (10 mg./l.) and water were distributed into muffled conical flasks of 200 ml. capacity, which were then sterilized. Each of the flasks was inoculated with 3.5 ml. of the seed culture prepared above, and incubated by the procedure described in Example 1.

The yield obtained with the use of copper was 42 percent based on the acetic acid used. In contrast, the yield realized without the addition of copper acetate was 5%. A 1-liter portion of the culture broth obtained with the addition of copper acetate was centrifuged to remove the solids. Then, the broth was treated in the conventional manner to crystallize, L-glutamic acid whereupon 50 g. of crude crystals of L-glutamic acid were obtained.

EXAMPLE 3

The procedures of Example 1 were followed except:

that no copper salt was added to the main-culture medium but 2 p.p.m. of copper was incorporated in the seed-culture medium (added in the form of cupric sulfate), and that Brevibacterium thiogenitalis D-248 (IFO 12331) was used as the elaborating microorganism, whereby glutamic acid was obtained in a yield of 50% based on the acetic acid used. One liter of the resulting culture broth was centrifuged to remove solids and treated in the conventional manner to crystallize L-glutamic acid, whereupon 58 g. of crude crystals of L-glutamic acid was obtained.

EXAMPLE 4

Procedures similar to those described in Example 1 were followed, except:

that the seed-culture medium consisted of glucose (2.0%), urea (0.5%), corn steep liquor (1.0%), $KH_2PO_4$ (0.1%), $MgSO_4 \cdot 7H_2O$ (0.05%), $CaCO_3$ (0.1%), sodium oleate (200 mg./l.) and water;

that Brevibacterium thiogenitalis D-248 (IFO 12331) was used as the microorganism; and that no copper per se was added to the main-culture medium.

The resultant yield of L-glutamic acid was 51% relative to the acetic acid used. The broths were pooled and a one-liter portion of the same was treated in the routine procedure to crystallize L-glutamic acid, whereupon 60 g. of crude crystals of L-glutamic acid were obtained.

Incidentally the concentration of copper in the corn steep liquor employed above was 75 p.p.m., which is equivalent to concentrations of 0.75 p.p.m. and 0.049 p.p.m. in the seed-culture and main-culture media, respectively.

EXAMPLE 5

The effects of copper were studied by the procedures set forth in Example 4, except that the copper content of the corn steep liquor used was considerably lower. Thus, a corn steep liquor containing 5 p.p.m. of copper was incorporated in the seed-culture medium, and the yields of L-glutamic acid were compared for the culture broth obtained without the addition of copper to the seed medium versus the broth obtained with the addition of 1 p.p.m. copper (added as cupric chloride). It was found that the yields relative to the acetic acid used were 18% versus 50%, respectively.

EXAMPLE 6

The procedures of Example 2 were followed except that *Brevibacterium flavum* (ATCC 14067) was used as the microorganism. The resultant yields of L-glutamic acid relative to the acetic acid used were 29% from the culture broth obtained with the addition of cupric acetate and 4% from the culture broth obtained without addition of copper, respectively.

EXAMPLE 7

The procedures of Example 2 were followed except that *Micrococcus glutamicus* (ATCC 13032) was used as the microorganism. The resultant yields of L-glutamic acid relative to the acetic acid used were 33% from the culture broth obtained with the addition of cupric acetate and 5% from the culture broth of no copper constituent, respectively.

What is claimed is:

1. In a process for producing L-glutamic acid by cultivating an L-glutamic acid-producing microorganism in a culture medium comprising a carbon source and a nitrogen source and recovering the L-glutamic acid thus produced, the improvement wherein the carbon source is principally acetic acid, and copper is added to the culture medium and allowed to dispersed in the culture medium in a concentration of about 0.005 to 1 part per million parts of the medium.

2. The improvement according to claim 1, wherein the concentration of the copper cation in the medium is between 0.01 to 0.5 part per million.

References Cited

UNITED STATES PATENTS

| | | | |
|---|---|---|---|
| 3,616,213 | 10/1971 | Tsugawa et al. | 195—28 R |
| 3,616,210 | 10/1971 | Tanaka et al. | 195—28 R |
| 3,546,071 | 12/1970 | Douros et al. | 195—28 R |

LIONEL M. SHAPIRO, Primary Examiner

G. M. NATH, Assistant Examiner

U.S. Cl. X.R.

195—114